United States Patent
Gao et al.

(10) Patent No.: US 11,419,098 B2
(45) Date of Patent: Aug. 16, 2022

(54) METHOD AND DEVICE FOR REPORTING AND RECEIVING INFORMATION, AND COMPUTER READABLE STORAGE MEDIUM

(71) Applicant: ZTE Corporation, Shenzhen (CN)

(72) Inventors: Bo Gao, Shenzhen (CN); Yijian Chen, Shenzhen (CN); Yu Ngok Li, Shenzhen (CN); Zhaohua Lu, Shenzhen (CN); Yifei Yuan, Shenzhen (CN); Xinhui Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 197 days.

(21) Appl. No.: 16/610,697

(22) PCT Filed: Apr. 19, 2018

(86) PCT No.: PCT/CN2018/083745
§ 371 (c)(1),
(2) Date: Nov. 4, 2019

(87) PCT Pub. No.: WO2018/201913
PCT Pub. Date: Nov. 8, 2018

(65) Prior Publication Data
US 2021/0160853 A1    May 27, 2021

(30) Foreign Application Priority Data

May 5, 2017 (CN) .......................... 201710313781.3

(51) Int. Cl.
*H04W 72/04* (2009.01)
*H04W 72/08* (2009.01)
(Continued)

(52) U.S. Cl.
CPC ....... *H04W 72/0413* (2013.01); *H04L 5/0048* (2013.01); *H04W 24/10* (2013.01);
(Continued)

(58) Field of Classification Search
None
See application file for complete search history.

(56) References Cited

U.S. PATENT DOCUMENTS

2015/0036566 A1* 2/2015 Blankenship ....... H04W 52/367
370/311
2016/0150435 A1 5/2016 Baek
(Continued)

FOREIGN PATENT DOCUMENTS

| CN | 1722871 A | 1/2006 |
|---|---|---|
| CN | 104734805 A | 6/2015 |
| CN | 105052199 A | 11/2015 |

OTHER PUBLICATIONS

International Search Report for corresponding application PCT/CN2018/083745 filed Apr. 19, 2018; dated Jun. 29, 2018.

*Primary Examiner* — Steve R Young
(74) *Attorney, Agent, or Firm* — Cantor Colburn LLP

(57) ABSTRACT

Provided is a method for reporting information. The method includes following steps: determining that a beam link failure (BLF) condition is true; generating a first type of report information, where the first type of report information is at least used for notifying a second communication node of BLF; transmitting the first type of report information to the second communication node through an allocated first uplink resource. Provided also are a method for receiving information, apparatus for reporting information, apparatus for receiving information and computer readable storage medium.

15 Claims, 9 Drawing Sheets

(51) Int. Cl.
  *H04W 72/12*  (2009.01)
  *H04W 74/00*  (2009.01)
  *H04L 5/00*  (2006.01)
  *H04W 24/10*  (2009.01)

(52) U.S. Cl.
  CPC ....... *H04W 72/046* (2013.01); *H04W 72/085* (2013.01); *H04W 72/1273* (2013.01); *H04W 74/008* (2013.01)

(56) References Cited

U.S. PATENT DOCUMENTS

| | | | |
|---|---|---|---|
| 2018/0219606 A1* | 8/2018 | Ng | H04W 72/0453 |
| 2018/0279229 A1* | 9/2018 | Dinan | H04W 52/146 |
| 2020/0014453 A1* | 1/2020 | Takeda | H04W 56/001 |
| 2020/0028545 A1* | 1/2020 | Koskela | H04W 76/19 |
| 2020/0068416 A1* | 2/2020 | Kang | H04W 16/28 |
| 2020/0099437 A1* | 3/2020 | Harada | H04L 5/0053 |
| 2020/0145079 A1* | 5/2020 | Marinier | H04B 7/0456 |

\* cited by examiner

METHOD AND DEVICE FOR REPORTING AND RECEIVING INFORMATION, AND COMPUTER READABLE STORAGE MEDIUM

CROSS-REFERENCES TO RELATED APPLICATIONS

This application is a U.S. National Stage Application, filed under 35 U.S.C. 371, of International Patent Application No. PCT/CN2018/083745, filed on Apr. 19, 2018, which is based on and claims priority to Chinese patent application No. 201710313781.3 filed on May 5, 2017, the content of which are incorporated herein by reference in their entireties.

TECHNICAL FIELD

The present disclosure relates to the field of communication and, in particular, to a method and an apparatus for reporting information, a method and an apparatus for receiving information, and a computer readable storage medium.

BACKGROUND

High-band communication (also referred to as millimeter-wave communication) with ultra-wide bandwidth is an important direction for future mobile communication development, and attracts attention of the global academia and industry. In particular, the advantages of the millimeter-wave become more attractive when there are a large number of access to increasingly congested spectrum resources and physical networks. Corresponding standardization work is started in many standards organizations such as Institute of Electrical and Electronics Engineers (IEEE) and 3rd Generation Partnership Project (3GPP). For example, in the 3GPP standard organization, the high-band communication will become an important innovation for New Radio Access Technology (New RAT) of the fifth generation mobile communication technology (5G) by virtue of its ultra-wide bandwidth.

However, the high-band communication also faces challenges of link attenuation. In the face of the challenges, a high-band communication system may obtain high antenna gain and resist a signal transmission loss through a multi-antenna array and a beam forming scheme (also may be referred to as directional beam communication) by utilizing the characteristics of short wavelength of the high-band, easy antenna integration and the like. Therefore, link margin is ensured and communication robustness is improved.

However, in the high-band communication system, the directional beam communication obtains the link gain, and at the same time, reduces diversity of signals propagating in space, so that the directional beam communication may be affected by terminal movement and channel shielding, and the robustness of the directional beam communication is relatively poor. In some scenarios, beam link failure (BLF) may further be caused, so that the reliability and timeliness of wireless communication cannot be guaranteed during re-communication. In related art, there is no effective solution to this problem.

SUMMARY

The present disclosure provides a method and an apparatus for reporting information, a method and an apparatus for receiving information, and a computer readable storage medium.

The technical solution of the present disclosure is implemented through the followings.

The present disclosure provides a method for reporting information. The method includes steps described below:
determining that a beam link failure (BLF) condition is true;
generating a first type of report information, where the first type of report information is at least used for notifying a second communication node of BLF; and
transmitting the first type of report information to the second communication node through an allocated first uplink resource.

In the above solution, the method further includes steps described below:
executing, through a second uplink resource, at least one of following operations:
transmitting an uplink reference signal; or
transmitting an uplink control signaling.
The second uplink resource is a subset of the first uplink resource.

In the above solution, the method further includes steps described below.

When at least one of the uplink reference signal and the uplink control signaling to be transmitted on the second uplink resource collides with the first type of report information to be transmitted, the first type of report information is transmitted.

In the above solution, the uplink reference signal includes one of following signals:
a demodulation reference signal (DMRS);
a channel sounding reference signal (SRS);
a random access sequence signal; and
an allocated dedicated sequence.

In the above solution, when the at least one operation is executed through the second uplink resource, the method further includes steps described below:
indicating non-BLF in an implicit manner or an explicit manner.

In the above solution, the step in which the non-BLF is indicated in the implicit manner includes a step described below:
indicating the non-BLF through a specific sequence or a reserved field in the first type of report information.

In the above solution, the first uplink resource has a periodic characteristic and meets a time constraint.

In the above solution, the first type of report information further carries at least one of following information:
indication information indicating whether a downlink reference signal associated with a time-frequency resource carrying the first type of report information is a beam;
identity information of a first communication node; or
a beam index.

In the above solution, at least two types of downlink reference signals are renumbered using a uniform index.

In the above solution, the downlink reference signal includes at least one of following signals:
a synchronization signal (SS), a DMRS, or a channel state information reference signal (CSI-RS).

In the above solution, the DMRS associated with the time-frequency resource carrying the first type of report information meets at least one of following conditions:
the DMRS is associated with a physical broadcast channel (PBCH); and
the DMRS is associated with a common control channel.

In the above solution, each type of the at least two types of downlink reference signals meets at least one of conditions described below:

each type of the at least two types of downlink reference signals uses its own dedicated measurement threshold; or each type of the at least two types of downlink reference signals uses its own dedicated report threshold.

In the above solution, in case of beam correspondence or in a case where a channel reciprocity exists, a binding relation between an uplink reference signal and the downlink reference signal exists between the first uplink resource and the beam index; or in case of non-beam correspondence or in a case where the channel reciprocity does not exist, on the first uplink resource, every N uplink beam resources are grouped into one group, M groups are formed, and a same uplink precoding or a same transmitting beam is used in each of the M groups, where both N and M are integers greater than or equal to 1.

In the above solution, every N uplink beam resources are grouped into one group according to at least one of following grouping criterions:

a receiving manner;
a receiving beam combination;
an antenna group;
a receiving signal power;
a horizontal transmitting azimuth;
a vertical transmitting azimuth;
a horizontal receiving azimuth;
a vertical receiving azimuth;
average arrival time;
cluster arrival time;
a receiving resource corresponding to the first uplink resource;
a predetermined multiplexed manner;
a timing advance (TA) parameter;
a length of a cyclic prefix (CP);
a space division multiplexed manner; or
a quasi-co-location (QCL) relation.

In the above solution, when a dedicated resource carrying the first type of report information is allocated and uplink is synchronous, the first type of report information is carried by a physical uplink control channel (PUCCH).

Alternatively, when the dedicated resource carrying the first type of report information is not allocated or the uplink is out of synchronization, the first type of report information is carried by a physical random access channel (PRACH) or a channel similar to the PRACH (PRACH-like).

Alternatively, when the dedicated resource carrying the first type of report information is allocated and the uplink is out of synchronization, a radio link failure (RLF) process is executed.

In the above solution, when the first type of report information is transmitted to the second communication node through the allocated first uplink resource, the method further includes steps described below:

jointly coding the first type of report information and a scheduling request signaling; or distributing the first type of report information and the scheduling request in a same uplink control signaling.

The present disclosure further provides a method for receiving information. The method includes steps described below:

receiving a first type of report information transmitted from a first communication node, where the first type of report information is transmitted through an allocated first uplink resource, and the first type of report information is at least used for notifying a second communication node of beam link failure (BLF); and transmitting an acknowledgement signaling to the first communication node through a configured time-frequency domain resource, where the configured time-frequency domain resource is a time-frequency domain resource of a search space of a downlink control channel.

In the above solution, when the first type of report information further carries information of one beam, and the acknowledgement signaling is transmitted to the first communication node through the configured time-frequency domain resource, a transmitting beam for transmitting the acknowledgement signaling is a transmitting beam corresponding to the information of the beam.

In the above solution, when the first type of report information further carries information of at least two beams, the transmitting beam for transmitting the acknowledgement signaling is one of following beams:

a first beam; and
a beam in a specific location.

In a preconfigured criterion, the acknowledgement signaling is transmitted through respective beams.

The present disclosure further provides an apparatus for reporting information. The apparatus includes a generation unit and a first transmission unit.

The generation unit is configured to determine that a BLF condition is true, and generate a first type of report information. The first type of report information is at least used for notifying a second communication node of BLF.

The first transmission unit is configured to transmit the first type of report information to the second communication node through an allocated first uplink resource.

In the above solution, the first transmission unit is further configured to execute, through a second uplink resource, at least one of operations described below:

transmitting an uplink reference signal; or
transmitting an uplink control signaling.

The second uplink resource is a subset of the first uplink resource.

The present disclosure further provides an apparatus for reporting information. The apparatus includes a processor and a memory. The memory is configured to store computer programs capable of executing on the processor.

The processor is configured to, when executing the computer programs, perform steps in the above method for reporting information.

The present disclosure further provides an apparatus for receiving information. The apparatus includes a second reception unit and a second transmission unit.

The second reception unit is configured to receive a first type of report information transmitted from a first communication node. The first type of report information is transmitted through an allocated first uplink resource, and the first type of report information is at least used for notifying a second communication node of BLF.

The second transmission unit is configured to transmit an acknowledgement signaling to the first communication node through a configured time-frequency domain resource. The configured time-frequency domain resource is a time-frequency domain resource of search space of a downlink control channel.

In the above solution, when the first type of report information further carries information of at least two beams, the transmitting beam for transmitting the acknowledgement signaling is one of following beams:

a first beam; and
a beam in a specific location.

In a preconfigured criterion, the acknowledgement signaling is transmitted through respective beams.

The present disclosure further provides an apparatus for receiving information. The apparatus includes a processor and a memory. The memory is configured to store computer programs capable of executing on the processor.

The processor is configured to, when executing the computer programs, perform steps in the above method for receiving information.

The present disclosure further provides a computer readable storage medium. Computer programs are stored in the computer readable storage medium. The computer programs, when executed by a processor, implement steps in the above method for reporting information, or implement steps in the above method for receiving information.

The present disclosure provides the method and apparatus for reporting information, the method and apparatus for reporting information, and the computer readable storage medium. The first communication node determines the BLF condition is true, and generates the first type of report information. The first type of report information is at least used for notifying the second communication node of the BLF. The first type of report information is transmitted to the second communication node through the allocated first uplink resource. After receiving the first type of report information, the second communication node transmits the acknowledgement signaling to the first communication node through the configured time-frequency domain resource. The configured time-frequency domain resource is the time-frequency domain resource of the search space of the downlink control channel. When the BLF occurs, because the first communication node notifies the second communication node timely, the first communication node and the second communication node can be accelerated to find an effective beam combination.

BRIEF DESCRIPTION OF DRAWINGS

In the drawings (which are not necessarily drawn to scale), similar reference numerals may describe similar components in different views. The drawings generally illustrate various embodiments discussed herein by way of example and not by way of limitation.

DETAILED DESCRIPTION

Figure 1:
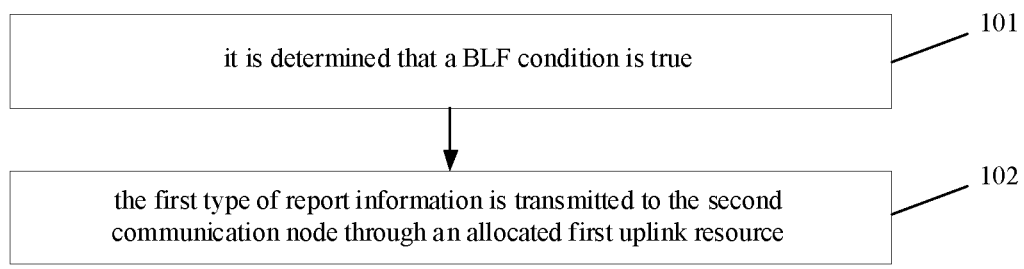
FIG. 1 is a flowchart of a method for reporting information at a first communication node side according to an embodiment of the present disclosure.

The present disclosure is described in further detail hereinafter with reference to the drawings and embodiments.

High-band communication with ultra-wide bandwidth becomes a major concern at present due to its advantage of the bandwidth. However, the high-band communication faces challenges of link attenuation such as a large propagation path loss, greater absorption of air (especially oxygen), and heavier rain attenuation effect. In the face of the challenges, a high-band communication system may obtain high antenna gain and resist a signal transmission loss through a multi-antenna array and a beam forming scheme by utilizing the characteristics of short wavelength of the high-band, easy antenna integration and the like. Therefore, link margin is ensured and communication robustness is improved.

In the high-band communication system, in an antenna weight (also referred to as a pre-coding or a beam) training process, a transmitter transmits a training pilot, and a receiver receives a channel and executes channel estimation. Then, the receiver needs to feed back channel state information to the transmitter, so that a transceiver may conveniently find multiple groups of transceiver antenna weight pairs required by multi-path data transmission in optional transceiver antenna weight pairs, and the overall frequency spectral efficiency may be improved.

At present, the high-band communication system obtains the link gain through the directional beam communication, and at the same time, reduces diversity of signals propagating in space, so as to be affected by terminal movement and channel shielding. In some specific scenarios, such as a scenario in which the terminal moves rapidly or a scenario in which Discontinuous Reception (DRX) is performed, BLF may be caused, and thus reliability and timeliness of wireless communication cannot be guaranteed during re-communication.

It should be noted that a radio access process, i.e., a RLF process, may be performed after the BLF occurs. However, the process causes a relatively large time delay to the radio communication, so that there is no related technical solution to reduce the time delay after the BLF occurs.

In addition, no effective solution is provided for determining whether the time-frequency resource carrying the beam link may be shared and multiplexed with other services.

Based on this, in various embodiments of the present disclosure, when the BLF occurs, a first communication node transmits a first type of report information for notifying a second communication node of the BLF to the second communication node, so that the second communication node may know the BLF in time, and the first communication node and the second communication node may be accelerated to find an effective beam combination.

In addition, to save resources, the first communication node may transmit an uplink reference signal and an uplink control signaling through an allocated uplink resource.

In practical application, uplink refers to a direction in which a terminal transmits information to a base station; accordingly, downlink refers to a direction in which the base station transmits information to the terminal.

Therefore, the first communication node refers to the terminal and the second communication node refers to the base station. The solution of the embodiment of the present disclosure may be further understood as the followings: the base station allocates an uplink resource to the terminal for carrying a beam recovery signaling. In order to reduce the waste of resources, the terminal may transmit an uplink reference signal or other uplink control signaling (e.g. a scheduling request) through the uplink resource. However, when the BLF occurs, the terminal uses the uplink resource to carry the beam recovery signaling. That is, the priority of transmitting the beam recovery signaling is the highest.

Embodiment 1

The method for reporting information provided by the embodiment of the present disclosure is applied to a first communication node. As shown in FIG. 1, the method includes steps described below.

In a step 101, it is determined that a BLF condition is true.

Here, the first type of report information is at least used for notifying a second communication node of BLF.

In practical application, the BLF condition refers that a beam related parameter or a parameter combination meets a threshold condition. For example, the BLF condition may be as follows:
1) qualities of a number O of unmarked beam links is greater than or equal to a common threshold or respective thresholds.
2) The differences between the qualities of the O unmarked beam links and the sum of the qualities of a number K of marked beam links or the ratios of the qualities of the O unmarked beam links to the sum of the qualities of a number K of marked beam links are greater than or equal to a common threshold or respective thresholds.
3) A correlation of a time-frequency channel response of the O unmarked beam links and the K marked beam links, a correlation of a frequency-domain channel response of the O unmarked beam links and the K marked beam links, or a spatial correlation of the O unmarked beam links and the K marked beam links is lower than a common threshold or pairwise respective thresholds.
4) The differences between the azimuth angles of the O unmarked beam links and the azimuth angles of the K marked beam links or the ratios of the azimuth angles of the O unmarked beam links to the azimuth angles of the K marked beam links are larger than a common threshold or pairwise respective thresholds.
5) The qualities of the K marked beam links are less than a common threshold or respective thresholds.
6) The qualities of all of the marked beam links are less than a common threshold or respective thresholds.
7) The time accumulated from the last successful reception of the control channel or data channel is greater than a common threshold or respective thresholds.
8) The cumulative number of unsuccessful receptions is greater than a common threshold or respective thresholds.
9) Beam grouping adjustment information.
10) Weighted values or weighted correlation values of a part of the above parameters.

In practical application, the marked and unmarked beam links may be implemented by different configuration indications for the reference signals. O and K are positive integers, and the specific values of O and K may be determined as required.

It should be noted that the embodiment of the present disclosure does not limit the BLF condition, and in practical application, other BLF conditions may be configured as required.

In a step 102, the first type of report information is transmitted to the second communication node through an allocated first uplink resource.

The first type of report information may be referred to as a beam recovery signaling.

In practical application, the beam recovery signaling may be composed of two bits or four types of reference signal sequences to indicate whether the link fails, and whether the downlink reference signal associated with the uplink resource carrying the first type of report information is a new available beam, that is, [the link fails, and the associated downlink reference signal is a new available beam].

Specifically, in the first situation, when non-BLF occurs, the uplink resource may be configured to carry a PUCCH and/or an SRS for uplink beam training.

At this time, the specific content of the beam recovery signaling may be the following: [the link fails, and the associated downlink reference signal is a new available beam]=[0, 0].

In the second situation, when the BLF occurs and no potential available beam is found, the uplink resource may be configured to carry the PUCCH for the uplink beam training.

At this time, the specific content of the beam recovery signaling may be the following: [the link fails, and the associated downlink reference signal is a new available beam]=[1, 0].

In the third situation, the BLF occurs and a potential available beam is found.

At this time, the specific content of the beam recovery signaling may be the following: [the link fails, and the associated downlink reference signal is a new available beam]=[1, 1].

In the fourth situation, when the non-BLF occurs, an effective downlink beam is found.

At this time, the specific content of the beam recovery signaling may be the following: [the link does not fail, and the associated downlink reference signal is a new available beam]=[0, 1].

In practical application, the second communication node may know which of the above situations according to the specific content of the beam recovery signaling.

The second communication node knows the associated downlink reference signal through three possible manners described below.
1) When the time-frequency resource position of the beam recovery signaling is transmitted, the downlink reference signal is associated.
2) The associated downlink reference signal has been carried in an explicit manner on the PUCCH carrying the beam recovery signaling.
3) After the second communication node acknowledges a corresponding request carrying the beam recovery signaling, the first communication node may upload the associated downlink reference signal at a later position of the PUCCH.

For the above second manner, in practical application, not all allocated uplink resources may be required for transmitting the beam recovery signaling, and the second communication node (i.e., the base station) and the first communication node (i.e., the terminal) may negotiate which resource is configured to transmit the beam recovery signaling. Therefore, it is beneficial to reducing implementation complexity of the base station and giving the base station certain flexibility. In other words, for the allocated uplink resource, weather the terminal may be configured to perform the uplink beam training is configured by the base station and/or a criterion of the terminal.

That is, an implementation is that the uplink beam resource may be configured to perform the beam training or to carry the beam recovery signaling. However, not all such resources need to have this function. For example, resources for the beam training are allocated periodically, some resources may only perform normal beam training, and some resource may be chosen one from the other (i.e., the uplink beam training or from carrying the beam recovery signaling) by the terminal according to the current situation.

Based on this, in practical application, the first uplink resource may have a periodic characteristic and meets a time constraint.

The time constraint refers that the allocated first uplink resource is valid only within a limited time range, that is, the configured first uplink resource (such as the PUCCH) is time-dependent, so that unnecessary resource cost may be saved.

In a specific embodiment, the method may further include steps described below.

At least one of operations described below is executed through a second uplink resource:
transmitting an uplink reference signal, or
transmitting an uplink control signaling.

The second uplink resource is a subset of the first uplink resource.

Here, when at least one of the uplink reference signal and the uplink control signaling to be transmitted on the second uplink resource collides with the first type of report information to be transmitted, only the first type of report information is transmitted. In other words, the first type of report information is preferentially transmitted.

In practical application, the uplink reference signal may include one of following signals:
a DMRS;
an SRS;
a random access sequence signal, that is a random access channel signal (RACH); and
an allocated dedicated sequence.

The allocated dedicated sequence may be a corresponding PRACH-like.

In practical application, the uplink reference signal may further be a phase tracking reference signal (PT-RS).

In a specific embodiment, when the at least one operation is executed through the second uplink resource, the method may further include a step described below:
the non-BLF is indicated in an implicit manner or an explicit manner.

The step in which the non-BLF is indicated in the implicit manner includes a step described below:
the non-BLF is indicated through a specific sequence or a reserved field in the first type of report information.

In a specific embodiment, the first type of report information may further carry at least one of following information:
indication information indicating whether a downlink reference signal associated with a time-frequency resource carrying the first type of report information is a beam;
identity information of a first communication node; or
a beam index.

The beam may be a resource (such as transmitter pre-coding, receiver pre-coding, an antenna port, an antenna weight vector and an antenna weight matrix). Because the beam may be bound with some time-frequency code resources in transmission, the symbol of the beam may be replaced by a resource index. The beam may also be a transmission (transmitting or receiving) manner. The transmission mode may include Space Division Multiplexing (SDM), frequency/time domain diversity.

The beam indication refers that the first communication node conduct the indication through the current reference signal and an antenna port, and the reference signal (or a base reference signal) fed back by the first communication node or scanned by the second communication node and an antenna port meeting a QCL hypothesis.

Here, the parameters referred to the QCL at least include Doppler spread, Doppler translation, time delay spread, average time delay and average gain. The parameters referred to the QCL may further include spatial parameter information such as an angle of arrival, a spatial correlation of the receiving beam, the average delay, a correlation of the time-frequency channel response (including phase information).

The identity information may be a Medium Access Control (MAC) address, cell radio network temporary identity (C-RNTI), temporary C-RNTI (TC-RNTI), or dedicated identification (ID) associated to the first communication node (i.e., the terminal) by the second communication node (i.e., the base station), etc. Of course, in practical application, the identity information may also be other information capable of identifying the identity of the first communication node, as long as the identity of the first communication node may be identified, which is not limited in the embodiment of the present disclosure.

Since a new potential beam is found, multiple types of reference signals may be used, such as the SS (e.g., a Primary Synchronization Signal (PSS), a Secondary Synchronization Signal (SSS)), the CSI-RS and the DMRS. For convenience of management and cost saving, the multiple types of reference signals may be jointly coded using a uniform sequence number, so that the reference signals may use a uniform beam index. For example, the second communication node may configure CSI-RS and SS resources configured for the beam recovery to be jointly coded using a uniform index sequence number, and to be carried on the beam recovery signaling. For example, ID: 0-4 SS; 5~15 CSI-RS.

In this way, when joint coding is adopted, at least two types of downlink reference signals are renumbered using a uniform index.

The downlink reference signals include at least one of following signals: the SS, the DMRS or the CSI-RS.

In practical application, the downlink reference signals may further include at least one of following signals:
a cell reference signal (CRS);
a channel state information reference signal of beam management;
a channel state information interference measurement signal (CSI-IM);

the PT-RS;
a motion-related reference signal (MRS);
a beam reference signal (BRS);
a beam refined reference signal (BRRS);
the RACH;
an SS block;
the PSS; or
the SSS.

In practical application, the DMRS associated with the time-frequency resource carrying the first type of report information meets at least one of following conditions:
the DMRS is associated with a PBCH; or
the DMRS is associated with a common control channel.

Because transmission powers of the different types of reference signals are different, feedback thresholds corresponding to the different types of reference signals may be different or variable, or the thresholds may be configured. In this way, each type of the reference signals meets at least one of conditions described below:
each type of the at least two types of downlink reference signals uses its own dedicated measurement threshold.
each type of the at least two types of downlink reference signals uses its own dedicated report threshold.

In practical application, considering beam correspondence, in case of beam correspondence or in a case where channel reciprocity exists, a binding relation between the uplink reference signal and the downlink reference signal exists between the first uplink resource and the index.

The beam recovery signaling may only carry the ID information of the terminal in the explicit manner. Alternatively, the ID information of the terminal and the downlink reference signal are jointly coded, and the ID information of the terminal is embodied in the implicit manner.

Here, the binding relation (i.e., an association relation) between the uplink reference signal and downlink reference signal refers that a spatial parameter characteristic of the uplink reference signal may be determined by a spatial parameter characteristic of a channel experienced by the downlink reference signal. Conversely, a spatial parameter characteristic of the downlink reference signal may be determined by a spatial parameter characteristic of a channel experienced by the uplink reference signal. This characteristic is also referred to as meeting the QCL hypothesis, or meeting a spatial reciprocity QCL hypothesis. Specifically, a transmitting beam of the uplink reference signal may be determined by a receiving beam corresponding to the downlink reference signal; a transmitting beam of the downlink reference signal may be determined by a receiving beam corresponding to the uplink reference signal; a receiving beam of the uplink reference signal may be determined by a transmitting beam corresponding to the downlink reference signal; a receiving beam of the downlink reference signal may be determined by a transmitting beam corresponding to the uplink reference signal.

The receiving beam refers to a beam of the receiver that does not need to be indicated, or a beam resource of the receiver indicated by the QCL of the first communication node through the current reference signal and an antenna port, and the reference signal (or the base reference signal) scanned by the second communication node or fed back by the first communication node and an antenna port.

In case of non-beam correspondence or in a case where the channel reciprocity does not exist, on the first uplink resource, every N uplink beam resources are grouped into one group. The first communication node uses a same uplink pre-coding or a same transmitting beam in each group of the uplink resources.

That is, when the non-beam correspondence exists or the channel reciprocity does not exist, on the first uplink resource, every N uplink beam resources are grouped into one group, M groups are formed, and a same uplink pre-coding or a same transmitting beam is used in each of the M groups. Both N and M are integers greater than or equal to 1.

The group refers that beams having the same channel characteristics and/or transmission scheme and related channel state information are grouped into one set, so that the group may be referred to as the set.

Here, the channel characteristic includes physical propagation channel characteristics such as a horizontal transmitting azimuth, a vertical transmitting azimuth, a horizontal receiving azimuth, and a vertical receiving azimuth, and also includes characteristics of radio frequency and baseband circuits, such as an antenna element pattern, antenna group, balance panel, antenna sub-array, transceiver unit (TXRU), receiving beam set, antenna placement, baseband time offset, frequency offset and phase noise.

In practical application, each N uplink beam resources may be grouped into one group according to at least one of following grouping criteria (i.e., each group of criteria includes any one of the followings and any combination of the followings):
a receiving manner;
a receiving beam combination;
an antenna group;
a receiving signal power;
a horizontal transmitting azimuth;
a vertical transmitting azimuth;
a horizontal receiving azimuth;
a vertical receiving azimuth;
average arrival time;
cluster arrival time;
a receiving resource corresponding to the first uplink resource;
a predetermined multiplexed manner;
a timing advance (TA) parameter;
a length of a cyclic prefix (CP);
a space division multiplexed manner; or
a QCL relation.

In practical application, when the BLF condition is true, whether the beam recovery process or the radio access process, i.e., the RLF process is executed may be determined by a determination index that weather the uplink is synchronous. For example, when only PUCCH resources are allocated for the beam recovery, and the uplink is synchronous, the beam recovery process is executed; when the uplink is out of the synchronization, the radio access process is executed.

Here, when the PUCCH and PRACH or PRACH-like resources are simultaneously configured for the beam recovery, the condition for using the PUCCH is that there is a fixed UE ID and the uplink is synchronous. Accordingly, the condition for using the PRACH or the PRACH-like is that there is no fixed UE ID or the uplink is out of synchronization.

In other words, when the dedicated resource carrying the first type of report information is allocated and the uplink is synchronous, the first type of report information is carried by the PUCCH; when the uplink is out of synchronization, the first communication node executes the RLF process.

When the dedicated resource carrying the first type of report information is not allocated or the uplink is out of synchronization, the first type of report information is carried by a PRACH or a PRACH-like similar to the PRACH.

The PRACH-like refers to a channel carrying information through long preambles and sequences. Different sequences indicate different types of information. Under the situation of the uplink is out of synchronization, this mode may significantly ensure the transmission of uplink signals and avoid the interference to the uplink signals of other users.

In a specific embodiment, when the first type of report information is transmitted to the second communication node through the allocated first uplink resource, the method may further include steps described below.

The first type of report information and a scheduling request signaling are jointly coded. For example, the scheduling request that +1 bit/2 bits is used.

Alternatively, the first type of report information and the scheduling request are distributed in a same uplink control signaling.

Figure 2:
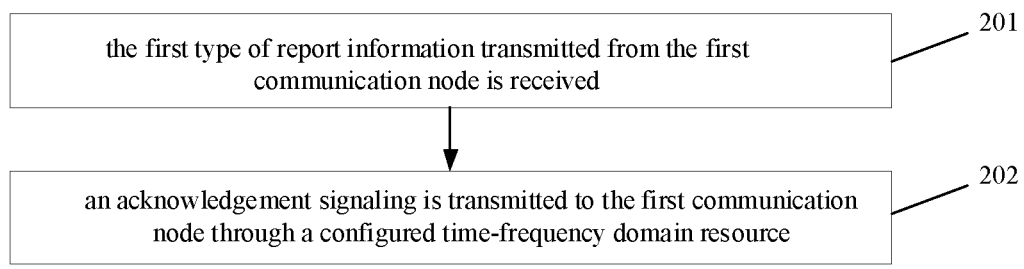
FIG. 2 is a flowchart of a method for receiving information at a second communication node side according to an embodiment of the present disclosure.

Correspondingly, an embodiment of the present disclosure further provides a method for receiving information, which is applied to the second communication node. As shown in FIG. 2, the method includes steps described below.

In a step 201, the first type of report information transmitted from the first communication node is received. The first type of report information is transmitted through the allocated first uplink resource, and the first type of report information is at least used for notifying the second communication node of the BLF.

In a step 202, an acknowledgement signaling is transmitted to the first communication node through a configured time-frequency domain resource. The configured time-frequency domain resource is a time-frequency domain resource of a search space of a downlink control channel.

When the first type of report information further carries information of one available beam, and the acknowledgement signaling is transmitted to the first communication node through the configured time-frequency domain resource, a transmitting beam for transmitting the acknowledgement signaling is a transmitting beam corresponding to the information of the available beam.

When the first type of report information further carries information of at least two available beams, the transmitting beam for transmitting the acknowledgement signaling is one of following beams:
a first available beam; or
an available beam in a specific location.

In a preconfigured criterion, the acknowledgement signaling is transmitted through respective beams (for example, transmitted periodically through respective available beams).

Here, in practical application, the second communication node (i.e., the base station) may configure a beam recovery configuration signaling to the first communication node (i.e., the terminal), which indicates that the number of beams that may be carried by each beam recovery signaling transmitted by the first communication node needs to be less than or equal to a number L. L is an integer greater than or equal to 1.

When the number of the available transmitting beams fed back by the first communication node to the second communication node through the beam recovery signaling (the first type of report information) is one, the first communication node defaults to use the downlink receiving beam corresponding to the transmitting beam for receiving. When the information of at least two available transmitting beams are fed back to the second communication node (it should be noted that these multiple beams may be carried in one signaling or may be respectively carried by the beam recovery signaling on multiple time-frequency domains), the base station transmits the acknowledgement signaling by time division and/or frequency division according to a specific criterion.

When the available transmitting beams are at least two, the at least two transmitting beams transmit the acknowledgement signaling in a time-division manner.

For example, within a period 0 to x1, the first beam (beam 1) is used; within a period x1 to x2, the second beam (beam 2) is used; and so on.

For another example, multiple transmitting beams may be used for poll transmitting.

Figure 3:
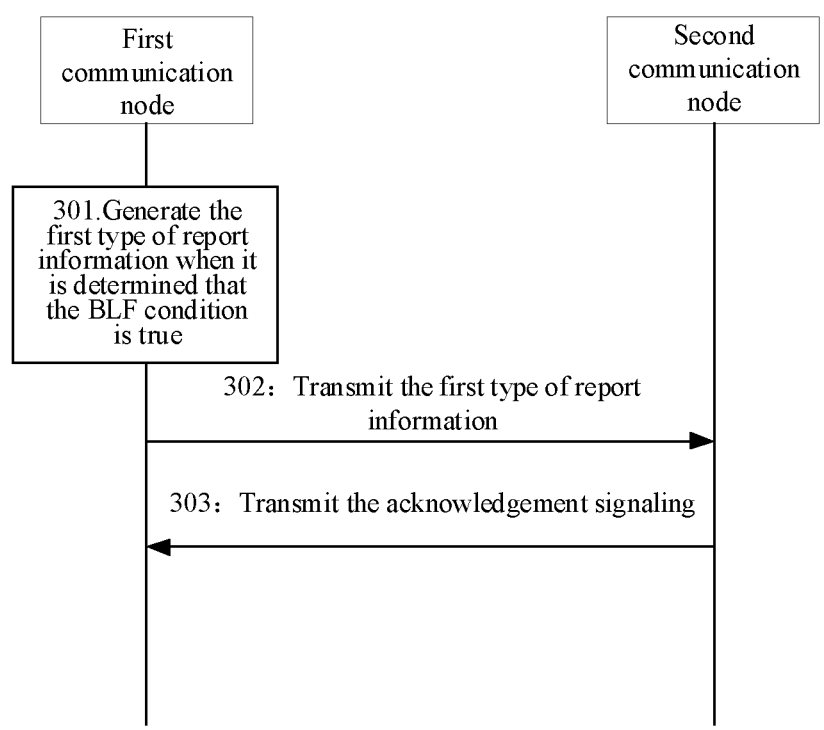
FIG. 3 is a flowchart of a method for transmitting information according to an embodiment of the present disclosure.

As shown in FIG. 3, a method for transmitting information provided by the embodiment of the present disclosure includes steps described below.

In a step 301, when determining that the BLF condition is true, the first communication node generates the first type of report information.

Here, the first type of report information is at least used for notifying the second communication node of the BLF.

In a step 302, the first communication node transmits the first type of report information to the second communication node through the allocated first uplink resource.

In a step 303, after receiving the first type of report information, the second communication node transmits the acknowledgement signaling to the first communication node through the configured time-frequency domain resource.

Here, the configured time-frequency domain resource is the time-frequency domain resource of the search space of the downlink control channel.

It should be noted that the specific processing procedure of the first communication node and the second communication node are described in detail above, and will not be described in detail herein.

The methods for reporting and receiving information provided by the embodiment of the present disclosure includes following steps: the first communication node determines that the BLF condition is true, and generates the first type of report information, where the first type of report information is at least used for notifying the second communication node of the BLF; the first type of report information is transmitted to the second communication node through the allocated first uplink resource; after receiving the first type of report information, the second communication node transmits the acknowledgement signaling to the first communication node through the configured time-frequency domain resource, where the configured time-frequency domain resource is the time-frequency domain resource of the search space of the downlink control channel. When the BLF occurs, because the first communication node notifies the second communication node timely, the first communication node and the second communication node can be accelerated to find an effective beam combination, that is, to establish a beam link.

In addition, at least one of following operations is executed through the second uplink resource: transmitting the uplink reference signal; or transmitting the uplink control signaling (such as the scheduling request). The second uplink resource is a subset of the first uplink resource. Therefore, the configured uplink resource carrying the beam link may be shared and multiplexed with other services, and the resources are greatly saved.

Embodiment 2

Figure 4:
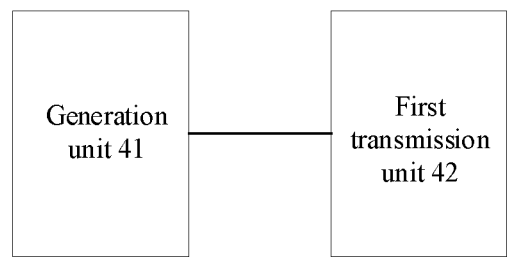
FIG. 4 is a structural diagram of an apparatus for reporting information according to an embodiment of the present disclosure.

The embodiment of the present disclosure provides an apparatus for reporting information to implement the method in the embodiment of the present disclosure. The apparatus is arranged on a first communication node. As shown in FIG. 4, the apparatus includes a generation unit 41 and a first transmission unit 42.

The generation unit 41 is configured to determine that a BLF condition is true, and generate a first type of report information. The first type of report information is at least used for notifying a second communication node of BLF.

The first transmission unit 42 is configured to transmit the first type of report information to the second communication node through an allocated first uplink resource.

The first transmission unit 42 is further configured to execute, through a second uplink resource at least one of operations described below:
transmitting an uplink reference signal, or
transmitting an uplink control signaling.

The second uplink resource is a subset of the first uplink resource.

Here, in practical application, when at least one of the uplink reference signal and the uplink control signaling to be transmitted on the second uplink resource collides with the first type of report information to be transmitted, the first transmission unit 42 only transmits the first type of report information. In other words, the first type of report information is preferentially transmitted.

In a specific embodiment, the first transmission unit 42, when executing the above at least one operation through the second uplink resource, indicates non-BLF in an implicit manner or an explicit manner.

The step in which the first transmission unit 42 indicates the non-BLF in the implicit manner includes a step described below:
the first transmission unit 42 indicates the non-BLF through a specific sequence or a reserved field in the first type of report information.

In a specific embodiment, the first transmission unit 42 is further configured to, when transmitting the first type of report information to the second communication node through the allocated first uplink resource, jointly code the first type of report information and a scheduling request signaling.

For example, the scheduling request that +1 bit/2 bits is used

Alternatively, the first transmission unit 42 is further configured to distribute the first type of report information and the scheduling request in a same uplink control signaling.

The apparatus for reporting information provided by the above embodiment is only exemplified by the division of the program modules when reporting information. In practical application, the above processing allocation may be completed by different program modules as required, that is, the internal structure of the apparatus is divided into different program modules to complete all or part of the above processing. In addition, the apparatus for reporting information and the method for reporting information provided by the above embodiments belong to the same concept, and the specific implementation process thereof is described in the method in the above embodiment, which is not described in detail herein.

Figure 5:
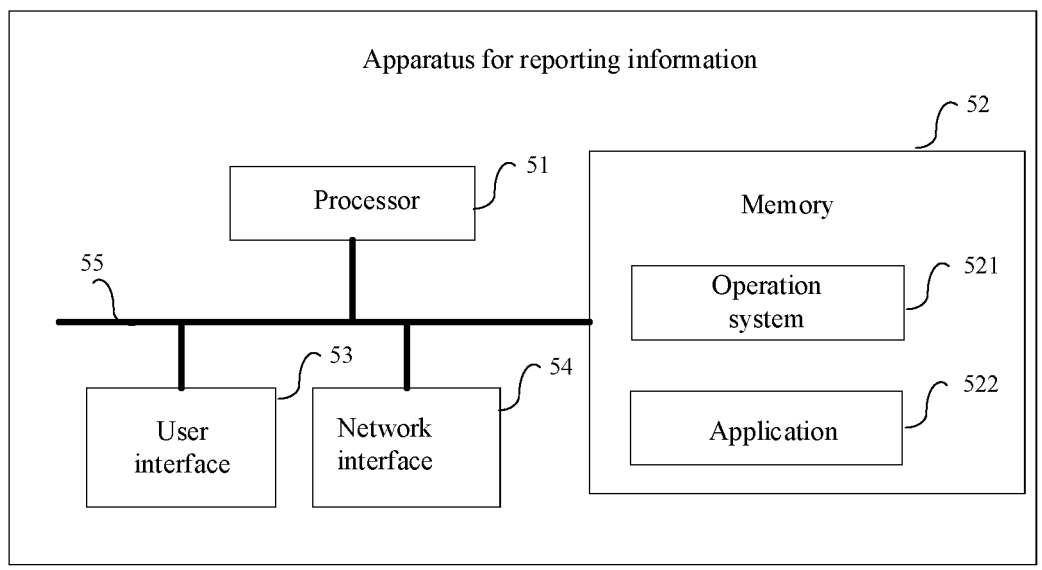
FIG. 5 is a hardware structure diagram of an apparatus for reporting information according to an embodiment of the present disclosure.

The embodiment of the present disclosure further provides an apparatus for reporting information. As shown in FIG. 5, the apparatus includes a processor 51 and a memory 52. The memory 51 is configured to store computer programs capable of executing on the processor.

The processor 51 is configured to, when executing the computer programs, perform steps described below:

determining that the BLF condition is true, and the first type of report information is generated, where the first type of report information is at least used for notifying the second communication node of the BLF; and
transmitting the first type of report information to the second communication node by the allocated first uplink resource.

The processor 51 is further configured to, when executing the computer programs, perform a step described below:
executing at least one of following operations through the second uplink resource:
transmitting the uplink reference signal, or
transmitting the uplink control signaling.

The second uplink resource is a subset of the first uplink resource.

The processor 51 is configured to, when executing the computer programs, perform a step described below.

When at least one of the uplink reference signal and the uplink control signaling to be transmitted on the second uplink resource collides with the first type of report information to be transmitted, only the first type of report information is transmitted. In other words, the first type of report information is preferentially transmitted.

The processor 51 is configured to, when executing the computer programs, perform a step described below:
the Non-BLF is indicated through the specific sequence or the reserved field in the first type of report information.

In a specific embodiment, the processor 51: is configured to, when executing the computer programs, perform a step described below:
when the first type of report information is transmitted to the second communication node through the allocated first uplink resource, the first type of report information and a scheduling request signaling are jointly coded;
for example, the scheduling request that +1 bit/2 bits is used;
alternatively, the first type of report information and the scheduling request are distributed in a same uplink control signaling.

Here, in practical application, as shown in FIG. 5, the apparatus for reporting information may further include at least one network interface 54 and a user interface 53. The various components in the apparatus for reporting information are coupled together by a bus system 55. It should be understood that the bus system 55 is configured to implement connection communication between these components. The bus system 55 includes a power bus, control bus and status signal bus in addition to a data bus. However, for clarity of illustration, the various buses are labeled as the bus system 55 in FIG. 5.

The number of the processors 51 may be at least one.

The user interface 53 may include a display, keyboard, mouse, trackball, click wheel, key, button, touch pad, touch screen, etc.

It should be understood that the memory 52 may be a volatile memory or a nonvolatile memory, or may include both the volatile memory and the nonvolatile memory. The non-volatile memory may be a Read Only Memory (ROM), Programmable Read-Only Memory (PROM), Erasable Programmable Read-Only Memory (EPROM), Electrically Erasable Programmable Read-Only Memory (EEPROM), ferromagnetic random access memory (FRAM), Flash Memory, magnetic surface memory, disk or Compact Disc Read-Only Memory (CD-ROM). The magnetic surface memory may be a disk storage or a tape storage. The volatile memory may be a Random Access Memory (RAM), which is used as an external cache. Many forms of RAM, such as a Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM) are available by way of example but not limitation. The memory 52 described in the embodiment of the present disclosure is intended to include, but not limited to, these and any other appropriate types of memory.

The memory 52 in the embodiment of the present disclosure is configured to store various types of data, so as to support an operation of the apparatus for reporting information. Examples of such data include that any computer program for operating on the apparatus for reporting information, such as an operation system 521 and an application 522. The operation system 521 includes various system programs, such as a framework layer, core library layer, and driver layer, for implementing various basic services and handling hardware-based tasks. The application 522 may include various applications such as a Media Player and a Browser, for implementing various application services. A program for implementing the method of the embodiments of the present disclosure may be included in the application 522.

The method disclosed in the above embodiments of the present disclosure may be applied to the processor 51 or implemented by the processor 51. The processor 51 may be an integrated circuit chip with signal processing capacity. In an implementation process, the steps of the above methods may be completed by the integrated logic circuit in a hardware form or instructions in a software form in the processor 51. The above processor 51 may be a general processor, Digital Signal Processor (DSP) or other programmable logic devices, discrete gates or transistor logic devices, discrete hardware components, etc. The processor 51 may implement or execute each method, step and logic block diagram disclosed in the embodiments of the present disclosure. The general processor may be a microprocessor or any conventional processor. The steps of the methods disclosed in the embodiments of the present disclosure may be directly executed by a hardware decoding processor, or by the combination of hardware and software modules in a decoding processor. The software modules may be located in a storage medium, and the storage medium is located in the memory 52. The processor 51 reads information in the memory 52, and completes the steps mentioned above in combination with the hardware of the processor 51.

In an exemplary embodiment, the embodiment of the present disclosure further provides a computer readable storage medium, such as the memory 52 including computer programs. The above computer programs may be executed by the processor 51 in the apparatus for reporting information to complete the steps of the above methods. The computer readable storage medium may be a memory such as a FRAM, ROM, PROM, EPROM, EEPROM, Flash Memory, magnetic surface Memory, optical disk, or CD-ROM.

Specifically, the embodiment of the present disclosure provides a computer readable storage medium. Computer programs are stored in the computer readable storage medium. The computer programs, when executed by the processor 51, executed steps described below.

It is determined that the BLF condition is true, and the first type of report information is generated. The first type of report information is at least used for notifying the second communication node that the BLF.

The first type of report information is transmitted to the second communication node through the allocated first uplink resource.

The computer programs, when executed by the processor 51, further execute a step described below.

At least one of operations described below is executed through the second uplink resource:
transmitting the uplink reference signal; or
transmitting the uplink control signaling.

The second uplink resource is a subset of the first uplink resource.

The computer programs, when executed by the processor 51, further execute a step described below:
when at least one of the uplink reference signal and the uplink control signaling to be transmitted on the second uplink resource collides with the first type of report information to be transmitted, only the first type of report information is transmitted. In other words, the first type of report information is preferentially transmitted.

In a specific embodiment, the computer programs, when executed by a processor, further execute a step described below:
the non-BLF is indicated in the implicit manner or the explicit manner.

The computer programs, when executed by a processor, execute a step described below:
the non-BLF is indicated through the specific sequence or the reserved field in the first type of report information.

Figure 6:
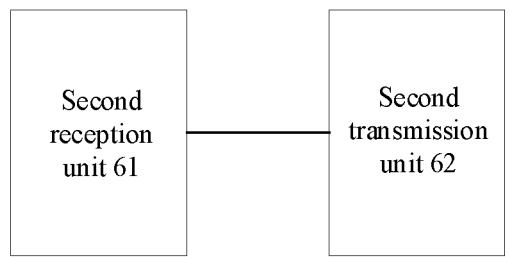
FIG. 6 is a structural diagram of an apparatus for receiving information according to an embodiment of the present disclosure.

To implement the method in the embodiments of the present disclosure, the embodiment provides an apparatus for receiving information, which is arranged on the second communication node. As shown in FIG. 6, the apparatus includes a second reception unit 61 and a second transmission unit 62.

The second reception unit 61 is configured to receive the first type of report information transmitted from the first communication node. The first type of report information is transmitted through the allocated first uplink resource, and the first type of report information is at least used for notifying the second communication node of the BLF.

The second transmission unit 62 is configured to transmit an acknowledgement signaling to the first communication node through a configured time-frequency domain resource. The configured time-frequency domain resource is a time-frequency domain resource of a search space of a downlink control channel.

When the first type of report information further carries information of one available beam, and the acknowledgement signaling is transmitted to the first communication node through the configured time-frequency domain resource, a transmitting beam for transmitting the acknowledgement signaling is a transmitting beam corresponding to the information of the beam.

When the first type of report information further carries information of at least two available beams, the transmitting beam for transmitting the acknowledgement signaling is one of following beams:
a first available beam; and
an available beam in a specific location.

In a preconfigured criterion, the acknowledgement signaling is transmitted through respective beams (for example, transmitted periodically through respective available beams).

The apparatus for receiving information provided by the above embodiment is only exemplified by the division of the program modules when receiving information. In practical application, the above processing allocation may be completed by different program modules as required, that is, the internal structure of the apparatus is divided into different program modules to complete all or part of the above processing. In addition, the apparatus for receiving information and the method for receiving information provided by the above embodiments belong to the same concept, and the specific implementation process thereof is described in the method in the above embodiments, which is not described in detail herein.

Figure 7:
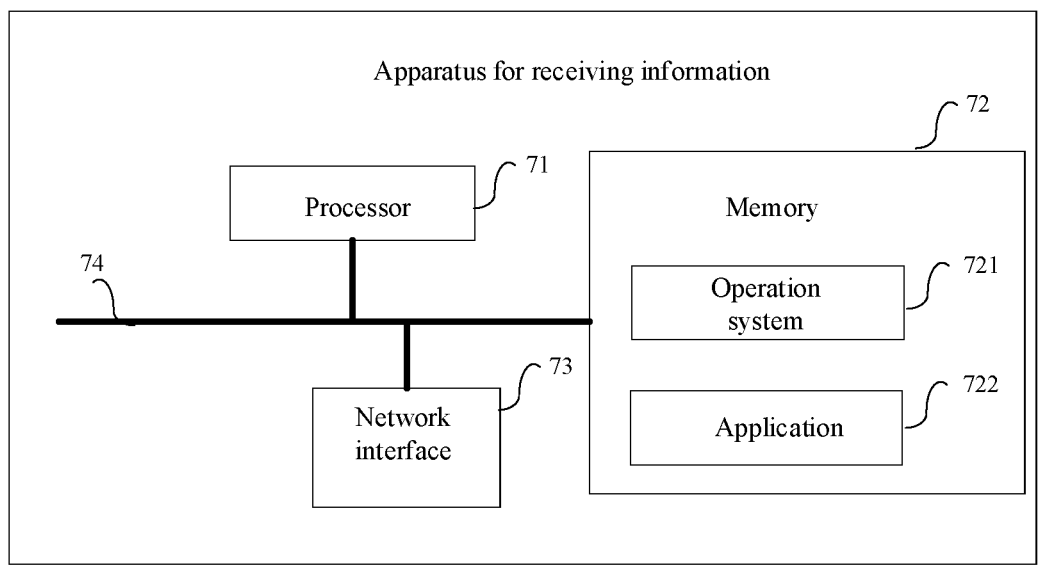
FIG. 7 is a hardware structure diagram of an apparatus for receiving information according to an embodiment of the present disclosure.

The present disclosure further provides an apparatus for receiving information. As shown in FIG. 7, the apparatus includes a processor 71 and a memory 72. The memory 71 is configured to store computer programs capable of executing on the processor 71.

The processor 71 is configured to, when executing the computer programs, perform steps described below:
the first type of report information transmitted from the first communication node is received, where the first type of report information is transmitted through the allocated first uplink resource, and the first type of report information is at least used for notifying the second communication node of the BLF;
the acknowledgement signaling is transmitted to the first communication node through the configured time-frequency domain resource, where the configured time-frequency domain resource is a time-frequency domain resource of a search space of a downlink control channel.

When the first type of report information further carries information of one beam, and the acknowledgement signaling is transmitted to the first communication node through the configured time-frequency domain resource, a transmitting beam for transmitting the acknowledgement signaling is a transmitting beam corresponding to the information of the beam.

When the first type of report information further carries information of at least two beams, the transmitting beam for transmitting the acknowledgement signaling is one of following beams:
a first available beam; and
an available beam in the specific location.

In the preconfigured criterion, the acknowledgement signaling is transmitted through respective beams (for example, transmitted periodically through respective available beams).

Here, in practical application, as shown in FIG. 7, the apparatus for receiving information may further include at least one network interface 73. The various components in the apparatus for receiving information are coupled together by a bus system 74. It should be understood that the bus system 74 is configured to implement connection communication between these components. The bus system 74 includes a power bus, control bus and status signal bus in addition to a data bus. However, for clarity of illustration, the various buses are labeled as the bus system 74 in FIG. 7.

The number of the processors 71 may be at least one.

It should be understood that the memory 72 may be a volatile memory or a nonvolatile memory, or may include both the volatile memory and the nonvolatile memory.

The memory 72 is configured to store various types of data, so as to support an operation of the apparatus for receiving information. Examples of such data include that any computer program for operating on the apparatus for receiving information, such as an operation system 721 and an application 722. The operation system 721 includes various system programs, such as a framework layer, core library layer, and driver layer, for implementing various basic services and handling hardware-based tasks. The application 722 may include various applications for implementing various application services. A program for implementing the method of the embodiments of the present disclosure may be included in the application 722.

The method disclosed in the above embodiments of the present disclosure may be applied to the processor 71 or implemented by the processor 71. The processor 71 may be an integrated circuit chip with signal processing capacity. In an implementation process, the steps of the above methods may be completed by the integrated logic circuit in a hardware form or instructions in a software form in the processor 71. The above processor 71 may be a general processor, a DSP or other programmable logic devices, discrete gates or transistor logic devices, discrete hardware components, etc. The processor 71 may implement or execute each method, step and logic block diagram disclosed in the embodiments of the present disclosure. The general processor may be a microprocessor or any conventional processor. The steps of the methods disclosed in the embodiments of the present disclosure may be directly executed by a hardware decoding processor, or by the combination of hardware and software modules in a decoding processor. The software modules may be located in a storage medium, and the storage medium is located in the memory 72. The processor 71 reads information in the memory 72, and completes the steps mentioned above in combination with the hardware of the processor 71.

In an exemplary embodiment, the embodiment of the present disclosure further provides a computer readable storage medium, such as the memory 72 including computer programs. The above computer programs may be executed by the processor 71 in the apparatus for receiving information to complete the steps of the above methods. The computer readable storage medium may be memory such as a FRAM, ROM, PROM, EPROM, EEPROM, Flash Memory, magnetic surface Memory, optical disk, or CD-ROM.

Specifically, the embodiment of the present disclosure provides a computer readable storage medium. Computer programs are stored in the computer readable storage medium. The computer programs, when executed by the processor 71, executed steps described below:
the first type of report information transmitted from the first communication node is received, where the first type of report information is transmitted through the allocated first uplink resource, and the first type of report information is at least used for notifying the second communication node of the BLF;
the acknowledgement signaling is transmitted to the first communication node through the configured time-frequency domain resource, where the configured time-frequency domain resource is a time-frequency domain resource of a search space of a downlink control channel.

When the first type of report information further carries information of one available beam, and the acknowledgement signaling is transmitted to the first communication node through the configured time-frequency domain resource, a transmitting beam for transmitting the acknowledgement signaling is a transmitting beam corresponding to the information of the beam.

When the first type of report information further carries information of at least two available beams, the transmitting beam for transmitting the acknowledgement signaling is one of following beams:
a first available beam; and
an available beam in the specific location.

In the preconfigured criterion, the acknowledgement signaling is transmitted through respective beams (for example, transmitted periodically through respective available beams).

Figure 8:
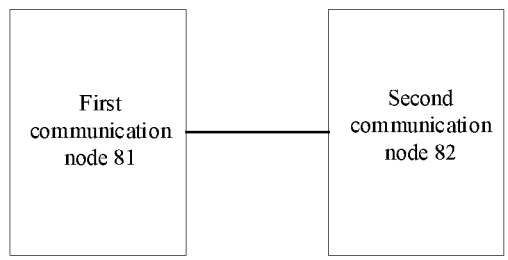
FIG. 8 is a structural diagram of a system for transmitting information according to an embodiment of the present disclosure.

The embodiment of the present disclosure further provides a system for transmitting information. As shown in FIG. 8, the system includes a first communication node 81 and a second communication node 82.

The first communication node 81 is configured to determine that the BLF condition is true, and generate the first type of report information, where the first type of report information is at least used for notifying the second communication node of the BLF; and transmit the first type of report information to a second communication node 82 through an allocated time-frequency domain resource.

The second communication node 82 is configured to transmit the acknowledgement signaling to the first communication node 81 through the configured time-frequency domain resources after receiving the first type of report information.

Here, the configured time-frequency domain resource is the time-frequency domain resource of the search space of the downlink control channel.

It should be noted that the specific functional processes of the first communication node 81 and the second communication node 82 are described in detail above, and are not described in detail herein.

The present disclosure is further described in detail below with reference to specific embodiments.

Specific Embodiment 1

The base station configures multiple reference signals to the terminal for finding a new beam. The configured multiple reference signals includes an SS block and a CSI-RS. The SS block includes a PSS, SSS and PBCH signal.

A DMRS signal associated with the PBCH signal exists in the PBCH signal.

Figure 9:
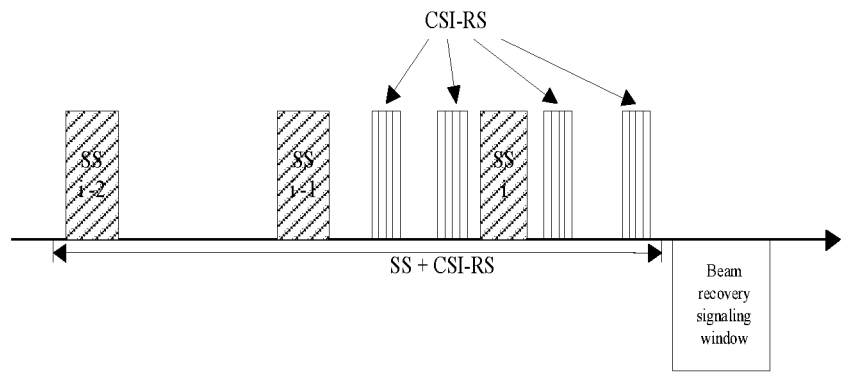
FIG. 9 is a schematic diagram of a beam recovery signaling for a CSI-RS and an SS according to a specific embodiment 1 of the present disclosure.

FIG. 9 is a schematic diagram of a beam recovery signaling for the CSI-RS and the SS in the specific embodiment 1 of the present disclosure. As shown in FIG. 9, within a beam recovery signaling window, multiple types of reference signals may be configured for finding a potential available beam, and information of an available beam will be carried in the beam recovery signaling. To support multiple types of reference signals, the multiple types of reference signals, namely, the SS and the CSI-RS (or the DMRS of the PBCH), are jointly coded using a set of common ID information of the terminal, i.e., a uniform index number.

Specific Embodiment 2

In the embodiment, the beam recovery signaling is carried through the PUCCH.

The time-frequency domain resource carrying the beam recovery signaling, i.e., the position of the time-frequency resource where the beam recovery signaling is located, is associated with the ID information of the terminal. That is, it may be known that the beam recovery signaling is transmitted by which user equipment (UE) through analyzing the corresponding time-frequency domain resource.

However, under the condition that beam correspondence exists and the condition that beam correspondence does not exist, the behavior characteristics of the user will be adjusted. To ensure the validity of the beam recovery, the resource carrying the beam recovery signaling will have a periodic characteristic, and a certain time constraint. That is, when the base station configures the time-frequency resource, the time-frequency resource is only valid within a limited time range.

Figure 10A:
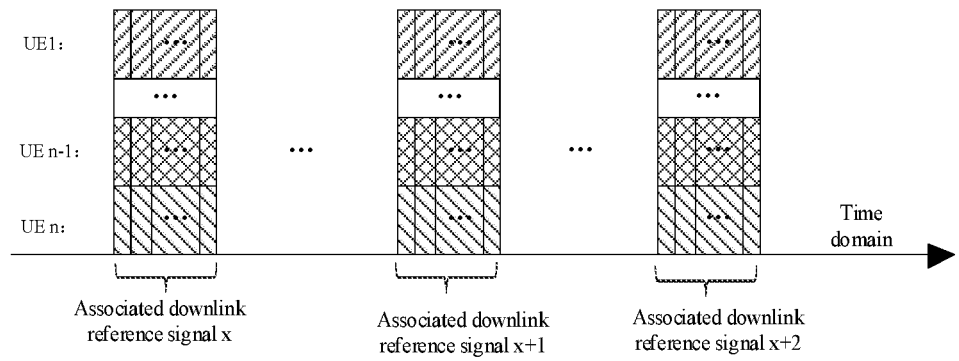
FIG. 10*a-c* are schematic diagrams of carrying a beam recovery signaling through a PUCCH according to a specific embodiment 2 of the present disclosure.

FIG. 10a is a schematic diagram of carrying the beam recovery signaling through the PUCCH in a case of the non-beam correspondence in the embodiment of the present disclosure. As shown in FIG. 10a, when the terminal considers that a downlink reference signal x may find an effective downlink beam, the terminal attempts to transmit the beam recovery signaling from multiple uplink beam recovery resource windows corresponding to the terminal. The terminal attempts to switch the corresponding uplink beam on the PUCCH resources in different time domains to implement uplink beam training. After determining that the PUCCH is effectively received, the base station configures the downlink transmitting beam implicitly indicated by the base station to transmit a beam recovery acknowledgement signaling. In this case, the downlink reference signal which is configured for finding a potential beam may be associated with time domain resources of the beam recovery signaling in multiple different time domains.

Figure 10B:
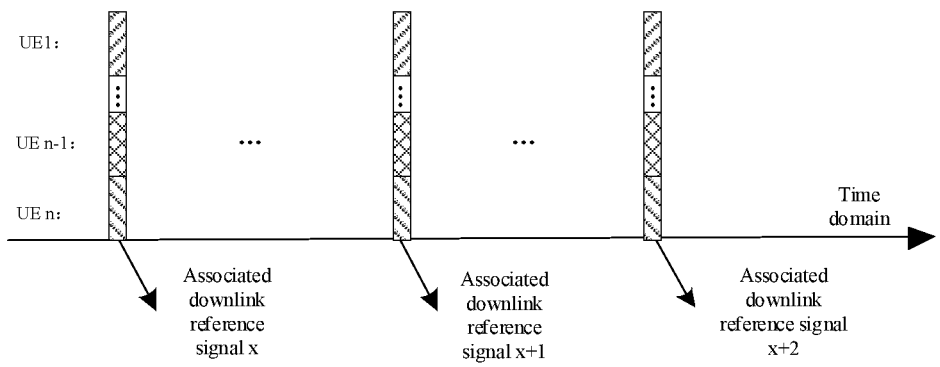

FIG. 10b is a schematic diagram of carrying the beam recovery signaling through the PUCCH in a case of the beam correspondence in the embodiment of the present disclosure. As shown in FIG. 10b, the dedicated time-frequency resource of the beam recovery signaling are associated with the downlink reference signal which may be configured for finding the potential beam. Meanwhile, the base station receives the beam recovery signaling through the receiving beam corresponding to the transmitting beam associated with the downlink reference signal. When the BLF occurs, the terminal transmits the beam recovery signaling through the uplink transmitting beam associated with receiving the downlink reference signal or the reference signal resources However, when the non-BLF occurs, the terminal may attempt to transmit the signaling through a transmitting beam different from the uplink transmitting beam associated with the downlink reference signal, which may be configured for the uplink beam training and channel estimation.

Figure 10C:
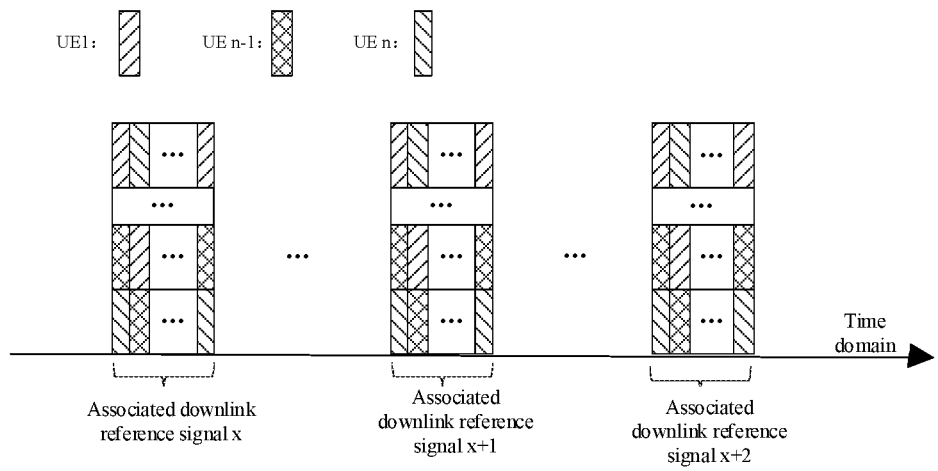

FIG. 10c is a diagram of the uplink resource that the beam recovery signaling may correspond to through a hopping mode (i.e., a frequency modulation mode). Uplink transmission resources of the same terminal corresponding to the same associated downlink reference signal resource do not need to be consistent on different time domain units, and may jump under the condition of meeting a specific function. This may avoid the beam recovery signaling from always being located in a frequency-domain selective channel drop region to a certain extent. It should be noted that even in a scenario of the beam correspondence, the relevant bit information of the carried beam recovery signaling may be allocated to different time-frequency resource positions.

Specific Embodiment 3

In the embodiment, the uplink channel estimation and transmitting the uplink signaling are performed through the beam recovery signaling field.

Figure 11:
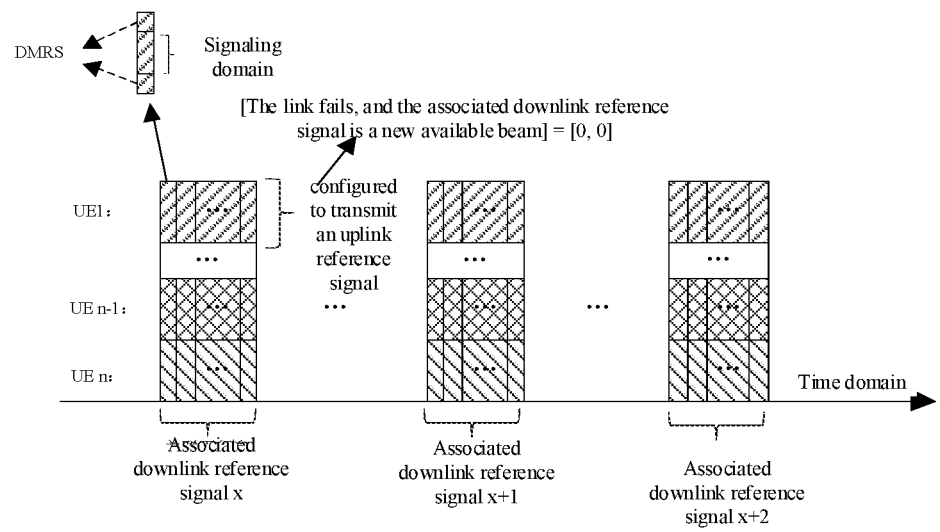
FIG. 11 is a schematic diagram of performing uplink channel estimation and transmitting an uplink signaling through a beam recovery signaling field according to a specific embodiment 3 of the present disclosure.

FIG. 11 is a schematic diagram of performing uplink channel estimation and transmitting the uplink signaling through the beam recovery signaling field in the embodiment of the present disclosure. As shown in FIG. 11, the DMRS associated with the beam recovery signaling may be configured for the uplink beam training or Reference Signal Received Power (RSRP) estimation of the uplink of the base station. For example, the signaling is that [the link fails, and the associated downlink reference signal is a new available beam]=[1/0, 0], or [the associated downlink reference signal is a new available beam]=[0] (i.e., the signaling is transmitted only when the BLF occurs). If it is indicated that the BLF does not occur, the field may be configured for the uplink channel estimation, and the uplink signal-to-noise ratio may be improved, or the RSRP associated with the uplink channel feedbacks and schedules requests. If the mode means a combined beam training of the uplink and the downlink when the BLF occurs, the terminal initiates the scanning to the uplink beam through these resources when the effective downlink is not found, so that the whole beam recovery process is accelerated. It should be noted that the beam transmitted through the search space of the downlink beam recovery acknowledge signaling needs to be associated with the signaling.

Specific Embodiment 4

In the embodiment, there are two resources for carrying beam recovery signaling, one is an uplink PUCCH, and the other is a PRACH/PRACH-like time-frequency resource. If the PUCCH and the PRACH/PRACH-like resource are simultaneously configured by the base station and configured to carry the beam recovery signaling, the condition for using the PUCCH is that there is a fixed UE ID and the uplink is synchronous; the condition for using the PRACH/PRACH-like is that there is no fixed UE ID or uplink is out of synchronization. Furthermore, the PUCCH may indicate multiple types of reference signal indexes through the explicit manner or the implicit manner, and the PRACH/PRACH-like field may carry only the reference signal index associated with the SS block through an implicit association manner.

Figure 12:
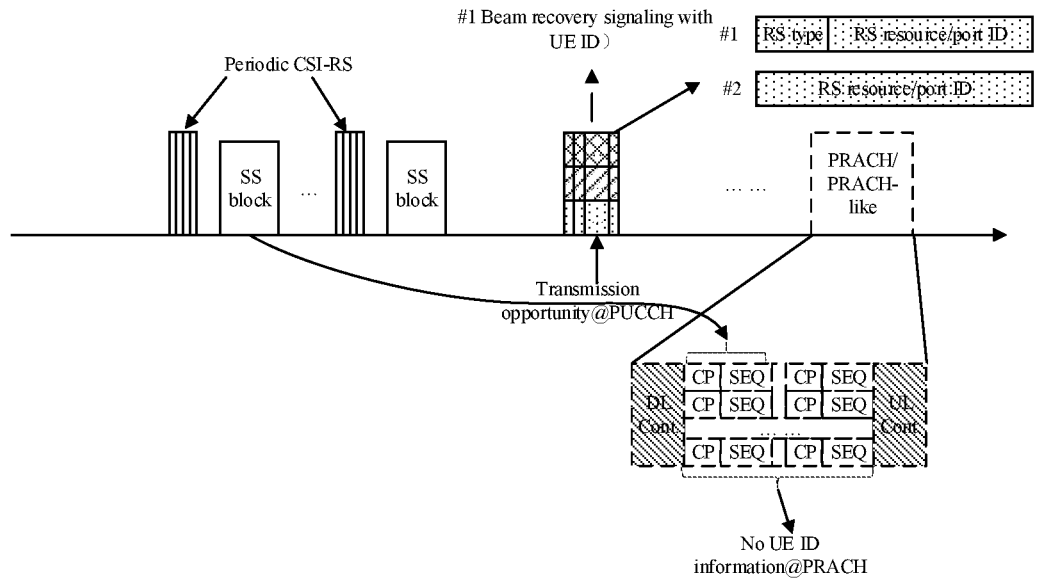
FIG. 12*a-b* are schematic diagrams of a beam recovery method according to a specific embodiment 4 of the present disclosure.
Figure 12:
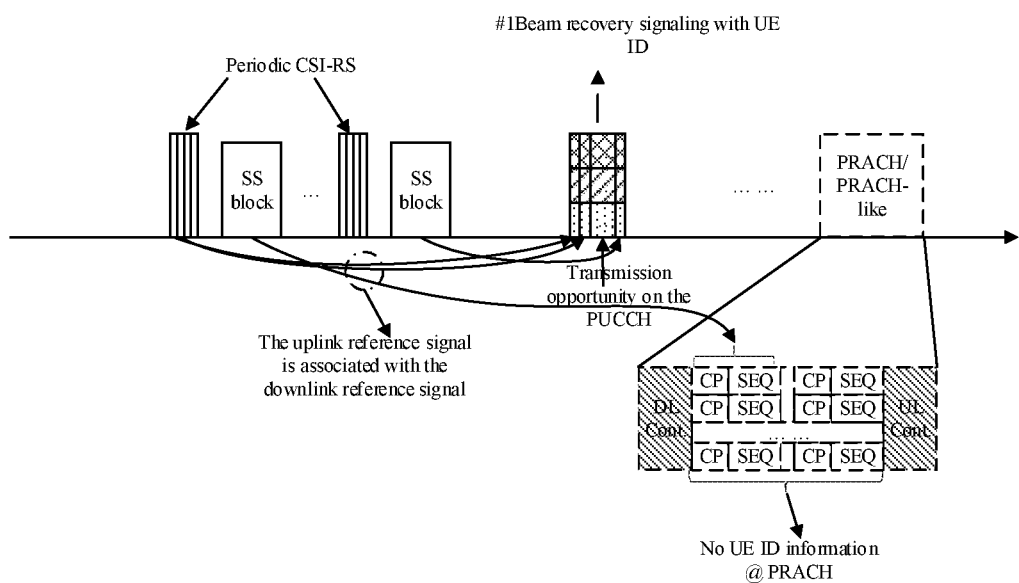

FIG. 12a is a schematic diagram of a beam recovery method in a case of the non-beam correspondence in the embodiment of the present disclosure. As shown in FIG. 12 a, in the case of the non-beam correspondence, the PUCCH may carry a downlink beam number in the explicit manner, and detect the uplink effective beam through an uplink repeat transmission method. There are two possible methods for a downlink beam index, one of which indicates the type of the reference signal first and then indicates the reference signal index; the other of which directly indicates a type of the specific reference signal through a joint coding method.

FIG. 12b is a schematic diagram of a beam recovery method in the case of the beam correspondence in the embodiment of the present disclosure. As shown in FIG. 12 b, in the case of the beam correspondence, the base station may first default that a correlation exists between the time-frequency resource carrying the uplink beam recovery signaling and the downlink reference signal resource. Therefore, the terminal only needs to carry the beam recovery signaling on the signaling associated with the reference signal.

Specific Embodiment 5

Figure 13:
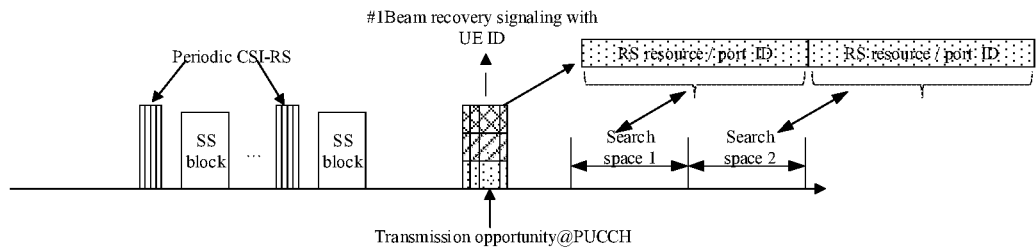
FIG. 13*a-b* are flowcharts of a beam recovery acknowledgement signaling under the condition that a beam recovery signaling carries multiple beams according to a specific embodiment 5 of the present disclosure.
Figure 13:
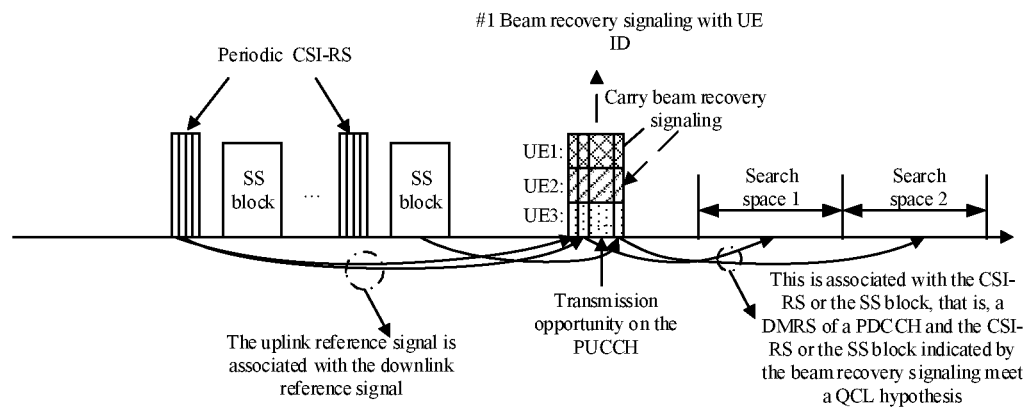

The embodiment describes a method for transmitting the beam recovery acknowledgement signaling when the beam recovery signaling carries multiple available beams. FIG. 13 is a flowchart of a beam recovery acknowledgement signaling under the condition that the beam recovery signaling carries multiple beams in the embodiment of the present disclosure. The flows associated with the two cases of the non-beam correspondence and the beam correspondence are shown in FIGS. 13a and 13b, respectively.

As shown in FIG. 13a, in the case of the non-beam correspondence, information of two available beams indicated by the terminal respectively correspond to different search space windows. If the terminal has received the signaling from the base station in a search space 1 window, searching for a search space 2 will be abandoned, and the uplink signaling will be transmitted for acknowledgement (even further downlink beam report may be carried) under the time-frequency resource position specified by the base station. If the user does not receive the acknowledgement signaling from the base station in the search space 1, the user attempts to further search in the search space 2.

As shown in FIG. 13b, in the case of the beam correspondence, two levels of correspondence will exist, i.e., the correspondence of the downlink reference signal and the uplink reference signal between the downlink reference signals (the CSI-RS and the SS block) and the PUCCH beam recovery signaling (here, the uplink reference signal corresponds to the DMRS of the PUCCH beam recovery signaling), and the correspondence of the uplink reference signal and the downlink uplink reference signal between the PUCCH beam recovery signaling and the search space of the downlink control channel will exist. Particularly for the latter, the correspondence with the previously transmitted downlink CSI-RS or SS block reference signal is implemented, i.e. the DMRS of the PDCCH and the CSI-RS or SS block indicated by the beam recovery signaling meet the QCL hypothesis.

In summary, in the technical solution provided by the embodiment of the present disclosure, the base station configures the beam recovery time-frequency resource for the terminal, and the beam recovery time-frequency resource is configured to carry the beam recovery request signaling. When the BLF does not occur in the terminal, the terminal may carry the uplink beam scanning through the resource (namely, transmit the uplink reference signal) and transmit the uplink control signaling. When the BLF occurs in the terminal but the effective downlink beam link is not found, the terminal configures the resource to carry the beam recovery signaling and performs the uplink beam training, so that the terminal and the base station may be accelerated to find an effective beam combination. When the BLF occurs in the terminal and the effective downlink beam link is found, the terminal may carry the downlink beam information on the time-frequency resource. Through the solution of the embodiment of the present disclosure, on one hand, the terminal can quickly notify the base station after the BLF occurs, and the beam recovery process is accelerated by utilizing the dedicated uplink resources; on the other hand, when the resource does not carry the beam recovery signaling, the resource may be configured for uplink beam scanning (namely, transmitting the uplink reference signals) and transmitting the uplink control signaling.

The above are only preferred embodiments of the present disclosure, and are not intended to limit the scope of the present disclosure.

INDUSTRIAL APPLICABILITY

In the solution provided by the embodiment of the present disclosure, the first communication node determines that the BLF condition is true, and generate the first type of report information. The first type of report information is at least used for notifying the second communication node of the BLF. The first type of report information is transmitted to the second communication node through the allocated first uplink resource. After receiving the first type of report information, the second communication node configures transmits the acknowledge signaling to the first communication node through the configured time-frequency domain resource. The configured time-frequency domain resource is a time-frequency domain resource of search space of the downlink control channel. When the BLF occurs, because the first communication node notifies the second communication node timely, the first communication node and the second communication node can be accelerated to find an effective beam combination.

What is claimed is:

1. A method for reporting information, comprising:
   determining that a beam link failure (BLF) condition is true;
   generating a first type of report information, wherein the first type of report information is at least used for notifying a second communication node of BLF;
   transmitting the first type of report information to the second communication node through an allocated first uplink resource; and
   when an uplink reference signal to be transmitted on a second uplink resource collides with the first type of report information to be transmitted on the allocated first uplink resource and in response to using the allocated first uplink resource for transmitting the first type of report information to notify the second communication node of the BLF, precluding transmission of the uplink reference signal.

2. The method of claim 1, wherein the uplink reference signal comprises one of:
   a demodulation reference signal (DMRS);
   a channel sounding reference signal (SRS);
   a random access sequence signal; and
   an allocated dedicated sequence.

3. The method of claim 1, wherein the first uplink resource has a periodic characteristic and meets a time constraint.

4. The method of claim 1, wherein the first type of report information further carries at least one of following information:
   indication information indicating whether a downlink reference signal associated with a time-frequency resource carrying the first type of report information is a beam;
   identity information of a first communication node; or
   a beam index.

5. The method of claim 4, wherein
   at least two types of downlink reference signals are renumbered using a uniform index.

6. The method of claim 5, wherein the downlink reference signal comprises at least one of:
   a synchronization signal; a DMRS; or a channel state information reference signal (CSI-RS).

7. The method of claim 6, wherein the DMRS associated with the time-frequency resource carrying the first type of report information meets at least one of following conditions:
   the DMRS is associated with a physical broadcast channel (PBCH); or
   the DMRS is associated with a common control channel.

8. The method of claim 5, wherein each type of the at least two types of downlink reference signals meets at least one of following conditions:

each type of the at least two types of downlink reference signals uses its own dedicated measurement threshold; or
each type of the at least two types of downlink reference signals uses its own dedicated report threshold.

9. An apparatus for reporting information, comprising: a processor and a memory, wherein the memory is configured to store computer programs executable on the processor;
   wherein the processor is configured to, when executing the computer programs, perform steps in the method of claim 1.

10. A computer readable storage medium, wherein computer programs are stored in the computer readable storage medium, and the computer programs, when executed by a processor, implement steps in the method of claim 1.

11. A method for receiving information, comprising:
   receiving a first type of report information transmitted from a first communication node through an allocated first uplink resource, wherein the first type of report information is at least used for notifying a second communication node of beam link failure (BLF); and
   wherein when an uplink reference signal to be transmitted on a second uplink resource collides with the first type of report information to be transmitted on the allocated first uplink resource and in response to using the allocated first uplink resource for transmitting the first type of report information to notify the second communication node of the BLF, transmission of the uplink reference signal is precluded.

12. An apparatus for receiving information, comprising: a processor and a memory, wherein the memory is configured to store computer programs executable on the processor;
   wherein the processor is configured to, when executing the computer programs, perform steps in the method of claim 11.

13. A computer readable storage medium, wherein computer programs are stored in the computer readable storage medium, and the computer programs, when executed by a processor, implement steps in the method of claim 11.

14. The method of claim 11, wherein the uplink reference signal comprises one of:
   a demodulation reference signal (DMRS);
   a channel sounding reference signal (SRS);
   a random access sequence signal; and
   an allocated dedicated sequence.

15. An apparatus for reporting information, comprising:
   a generation unit, which is configured to determine that a beam link failure (BLF) condition is true, and generate a first type of report information, wherein the first type of report information is at least used for notifying a second communication node of BLF; and
   a first transmission unit, which is configured to transmit the first type of report information to the second communication node through an allocated first uplink resource;
   wherein the first transmission unit is further configured to when an uplink reference signal to be transmitted on a second uplink resource collides with the first type of report information to be transmitted on the allocated first uplink resource and in response to using the allocated first uplink resource for transmitting the first type of report information to notify the second communication node of the BLF, preclude transmission of the uplink reference signal.

* * * * *